US009305116B2

(12) United States Patent
Agarwal et al.

(10) Patent No.: US 9,305,116 B2
(45) Date of Patent: Apr. 5, 2016

(54) DUAL DFA DECOMPOSITION FOR LARGE SCALE REGULAR EXPRESSION MATCHING

(75) Inventors: Virat Agarwal, Yorktown Heights, NY (US); Davide Pasetto, Dublin (IE); Fabrizio Petrini, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 441 days.

(21) Appl. No.: 12/763,510

(22) Filed: Apr. 20, 2010

(65) Prior Publication Data

US 2011/0258210 A1  Oct. 20, 2011

(51) Int. Cl.
*G06F 7/00* (2006.01)
*G06F 17/30* (2006.01)
*G06F 17/27* (2006.01)

(52) U.S. Cl.
CPC ...... *G06F 17/30985* (2013.01); *G06F 17/2775* (2013.01)

(58) Field of Classification Search
CPC .................................................. G06F 17/2775
USPC ......................................................... 707/602
See application file for complete search history.

(56) References Cited

U.S. PATENT DOCUMENTS

| 7,260,558 | B1 | 8/2007 | Cheng et al. |
| 7,689,530 | B1 * | 3/2010 | Williams et al. ................ 706/62 |
| 8,265,920 | B1 * | 9/2012 | Vanspauwen .................... 703/15 |
| 2003/0051043 | A1 | 3/2003 | Wyschogrod et al. |
| 2006/0085389 | A1 | 4/2006 | Flanagan et al. |
| 2006/0085533 | A1 * | 4/2006 | Hussain et al. ............... 709/223 |
| 2006/0174107 | A1 * | 8/2006 | Furlong et al. ................ 713/160 |
| 2007/0055664 | A1 | 3/2007 | Michaeli et al. |
| 2007/0130140 | A1 | 6/2007 | Cytron et al. |
| 2008/0046423 | A1 | 2/2008 | Khan Alicherry et al. |
| 2010/0191753 | A1 * | 7/2010 | Su et al. ........................ 707/758 |

FOREIGN PATENT DOCUMENTS

| CN | 101174261 | 5/2008 |
| JP | 10-207912 | 8/1998 |

(Continued)

OTHER PUBLICATIONS

International Search Report dated May 24, 2011 cited by the World International Patent Office Examiner from WIPO corresponding to PCT/EP2011/052263.

(Continued)

*Primary Examiner* — Ajith Jacob
(74) *Attorney, Agent, or Firm* — F. Chau & Associates, LLC (57) ABSTRACT

An apparatus includes a data processing system for matching a first input string with a first regular expression set. The data processing system includes a processor, a memory storing a computer program, a processor configured to execute the computer program. The computer program includes instructions for performing mapping at least two related symbols of the first regular expression set to a unique symbol, generating a second input string by replacing each instance of the at least two related symbols in the first input string with the unique symbol, and operating a first state machine on the input string and a second state machine on the second input string to determine whether the first input string matches with the first regular expression set.

23 Claims, 8 Drawing Sheets

(56) References Cited

FOREIGN PATENT DOCUMENTS

JP     2000231557    8/2000
JP     2009093391    4/2009

OTHER PUBLICATIONS

Navid Imani, "Multiple Regular Expressions Matching for Deep Packet Inspection", Simon Fraser University, Burnaby, BC, Canada, Oct. 29, 2007, navidi@sfu.ca.

Becchi et al., "Extending Finite Automata to Efficiently Match Perl-Compatible Regular Expressions", CoNEXT 2008, Dec. 9-12, 2008, Madrid, Spain.
Yu et al., "Fast and Memory-Efficient Regular Expression Matching for Deep Packet Inspection", ANC'S 06, Dec. 3-5, 2006, San Jose, California, pp. 1-10.
Becchi et al., "Memory-Efficient Regular Expression Search Using State Merging", IEEE INFOCOM 2007 proceeding, pp. 1064-1072.
Becchi et al., "An Improved Algorithm to Accelerate Regular Expression Evaluation", ANCS'07, Dec. 3-4, 2007, Orlando, Florida, pp. 145-154.

* cited by examiner

DUAL DFA DECOMPOSITION FOR LARGE SCALE REGULAR EXPRESSION MATCHING

ACKNOWLEDGEMENT

This invention was made with United States Government support under Contract No. H98230-07-C-0409, awarded by the Department of Defense. The United States Government has certain rights in this invention.

BACKGROUND

1. Technical Field

The present disclosure relates to regular expression processing. In particular, the present disclosure relates to apparatuses and methods for matching an input string with regular expression.

2. Discussion of Related Art

Regular expression set matching may be used to locate all occurrences of substrings of a given input string matching a regular expression. Exact set matching, also known as keyword matching or keyword scanning, is widely used in a number of applications, such as virus scanning and intrusion detection. However, keyword based approaches only allow the defining of static keywords.

Intrusion detection software and virus scanners may use a regular expression (regex) to capture more precise information and to perform deep packet scanning. The regular expression is a string of symbols (for example, characters, letters, and digits) that defines a pattern used in a search for a matching input string. The symbols used by the regular expression and by the input string are drawn from a set of the symbols, known as an alphabet of the regex.

Deep packet inspection enables advanced security functions as well as internet data mining, eavesdropping, and censorship. The processing needs for applications that perform deep packet inspection are increasing, due to the combined increase in network speeds, and network threats, such as viruses, malicious software (malware) and network attacks. Regular expressions can be used to express families of patterns. Matching input data against a set of regular expressions can be a very complex task and greatly depends on the features implemented in regular expressions. Several different formalism techniques are available, each building on the features of a "simpler syntax" and adding more features.

Several programming languages (for example, perl) directly provide regular expression support to ease programmer tasks when dealing with text analysis. Extended context free grammars (i.e., a context free grammar with regular expressions) may be used in a high level parser generator. Antivirus software may use regular expressions to scan for virus signatures in files and data. Genome researchers need to match Deoxyribonucleic acid (DNA) base sequences and patterns in their data. While very basic patterns can be searched using keywords, the more advanced patterns require a construct that is able to express more general patterns.

One approach handles regular expressions by building either a Deterministic Finite Automaton (DFA) or a Non-Deterministic Finite Automaton (NFA) from the expression set and then simulates the execution of these finite automata (also known as finite state automata, or state machines). A DFA is a state machine in which for each state and corresponding input, there is only one transition to a subsequent state. In contrast, an NFA is a state machine in which for each state and corresponding input, there may be a number of possible subsequent states.

A DFA approach must use a separate state for every possible partial match for every possible pattern instance, thereby leading to exponential memory requirements. Further, a DFA approach cannot count symbols, which again forces a complete expansion of every alternative, thereby leading again to exponential space requirements.

A NFA approach may require more than one state traversal per input character, and therefore are potentially very slow in practice and may require a large amount of history memory. Further, an NFA approach is non-deterministic, which may lead to an exponential time to simulate it using backtrack, or exponential space to encode every possible output state after each transition.

BRIEF SUMMARY

An apparatus according to an exemplary embodiment of the present invention includes a data processing system for matching a first input string with a first regular expression set. The data processing system includes a processor, a memory storing a computer program, a processor configured to execute the computer program. The computer program includes instructions for performing mapping at least two related symbols of the first regular expression set to a unique symbol, generating a second input string by replacing each instance of the at least two related symbols in the first input string with the unique symbol, and operating a first state machine on the input string and a second state machine on the second input string to determine whether the first input string matches with the first regular expression set.

The first state machine may include at least one first conditional final state, the second state machine may include at least one second conditional final state, and each first conditional final state may corresponds to at least one second final state. A match may be determined when the first state machine is in a conditional final state and the second state machine is in a corresponding conditional final state. At least one of the first state machine and the second state machine may further comprise at least one unconditional final state.

The apparatus may further include a network, where the data processing system receives the first input string across the network. At least one of the first state machine and the second state machine may be deterministic. The first input string and the second input string may be input into the first state machine and second state machine in parallel, respectively.

The second state machine may be built from a second expression set generated by replacing each instance of the at least two related symbols in the first regular expression set with the unique symbol. The first state machine may be built from a third expression set generated by re-writing at least one expression of the first expression set to reduce a number of the states of the at least one expression. When a regular expression of the first regular expression set includes a closure operator, a repetition operator, or an optional operator, the first regular expression set may be replaced with the third regular expression set, which is equivalent to the first regular expression set, but excludes the operators.

A method for matching a first input string with a first regular expression set in a data processing system according to an exemplary embodiment of the present invention includes determining a minimal set of non-overlapping symbol sets that are represented in the first regular expression set, mapping the non-overlapping symbol sets to new symbols, respectively, generating a second regular expression set by re-writing the first regular expression set to remove components that cause state machine complexities, generating a third regular expression set by replacing symbol sets in expressions in the first regular expression with the corresponding new symbols, and determining whether the first input string matches the first regular expression using a first state machine built from the second regular expression set and a second state machine build from the third regular expression set.

The final states may be either conditional or unconditional. At least one of the non-overlapping symbol sets may include only at least two alphabetic letters or at least one of the non-overlapping symbol sets may include only at least two numerals. The first input string may be received by the data processing system across a network. At least one of the first state machine and the second state machine may be deterministic. The first input string and the second input string may be input into the first state machine and second state machine in parallel, respectively.

The determining of whether the first input string matches the first regular expression may include generating a second input string be replacing symbol sets in expressions in the first input string with the corresponding new symbols, operating the first state machine on the first input string, operating the second state machine on the second input string, and determining a match based on outputs of the first state machine and the second state machine.

The determining of the match may include indicating a match when a state output by the first state machine is a final state and a state output by the second state machine is a corresponding final state. The determining of the match may include determining a non-match when a state output by one of the first or second state machines is an initial state.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more computer readable medium (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces). It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
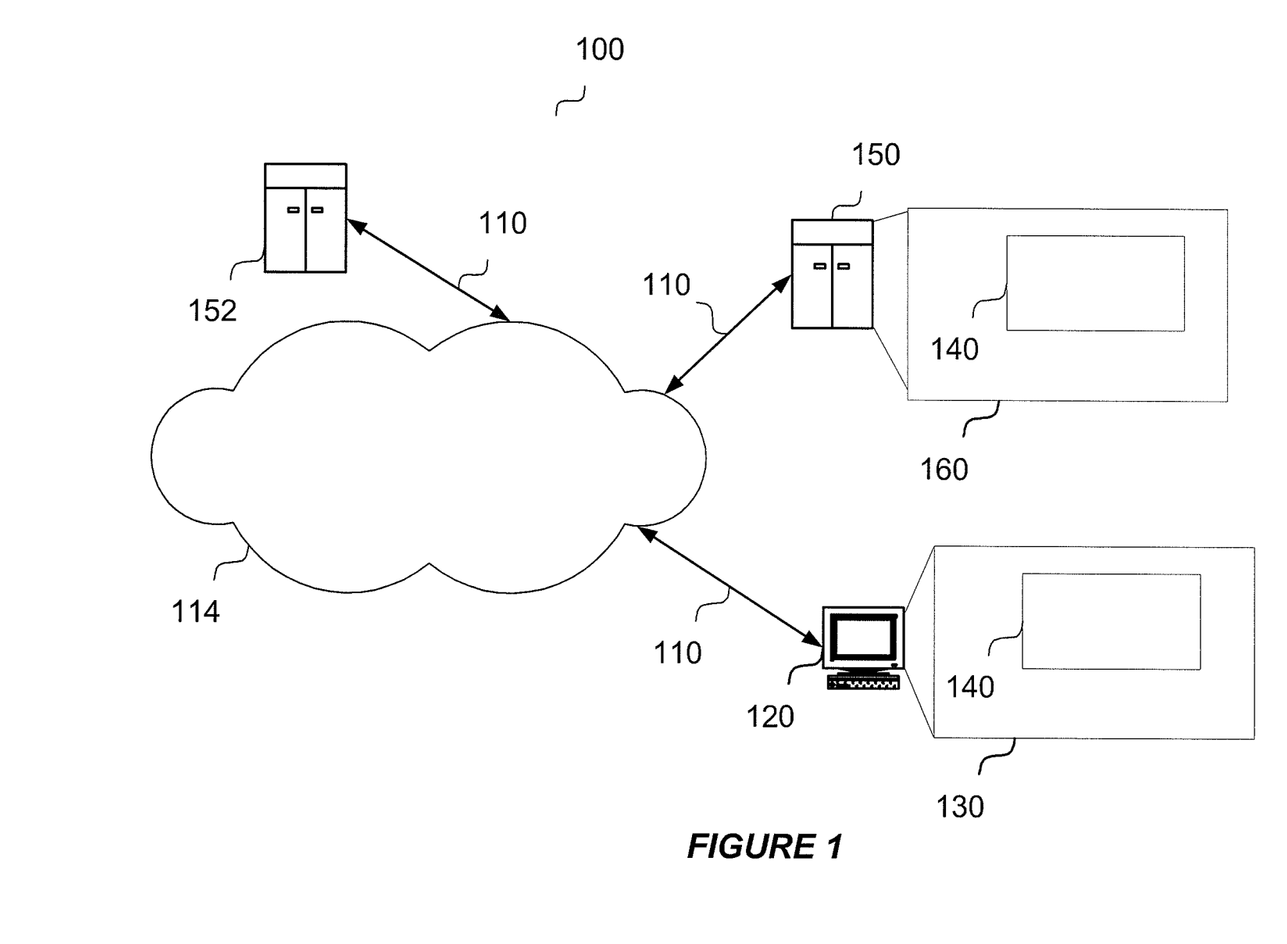
FIG. 1 is a block diagram depicting an exemplary data processing system in which an exemplary embodiment of the present invention may be implemented.

FIG. 1 is a block diagram depicting a data processing system 100, in which an exemplary embodiment of the present invention may be implemented. An example of a data processing system 100 is the Internet. A client application 130 is operable on a data processing system 100 that includes a workstation 120, and servers 150 and 152. The workstation 120 and the servers are connectable through a network 114, which may include wired networks 110. The server 152 may be a name server 152, which is also connectable to the network 114. The name server 152 translates a uniform resource locator (URL) into an Internet Protocol (IP) address.

The client application 130 receives a message 140 (e.g., an email) from a server application 160 operable on the server 150. The message 140 may contain a virus that includes a string as a signature. The client application 130 analyzes the message 140 to compare the string of the message 140 with known virus signatures. The comparison may be made by matching the string with a regular expression (regex) that represents the signature.

Figure 2:
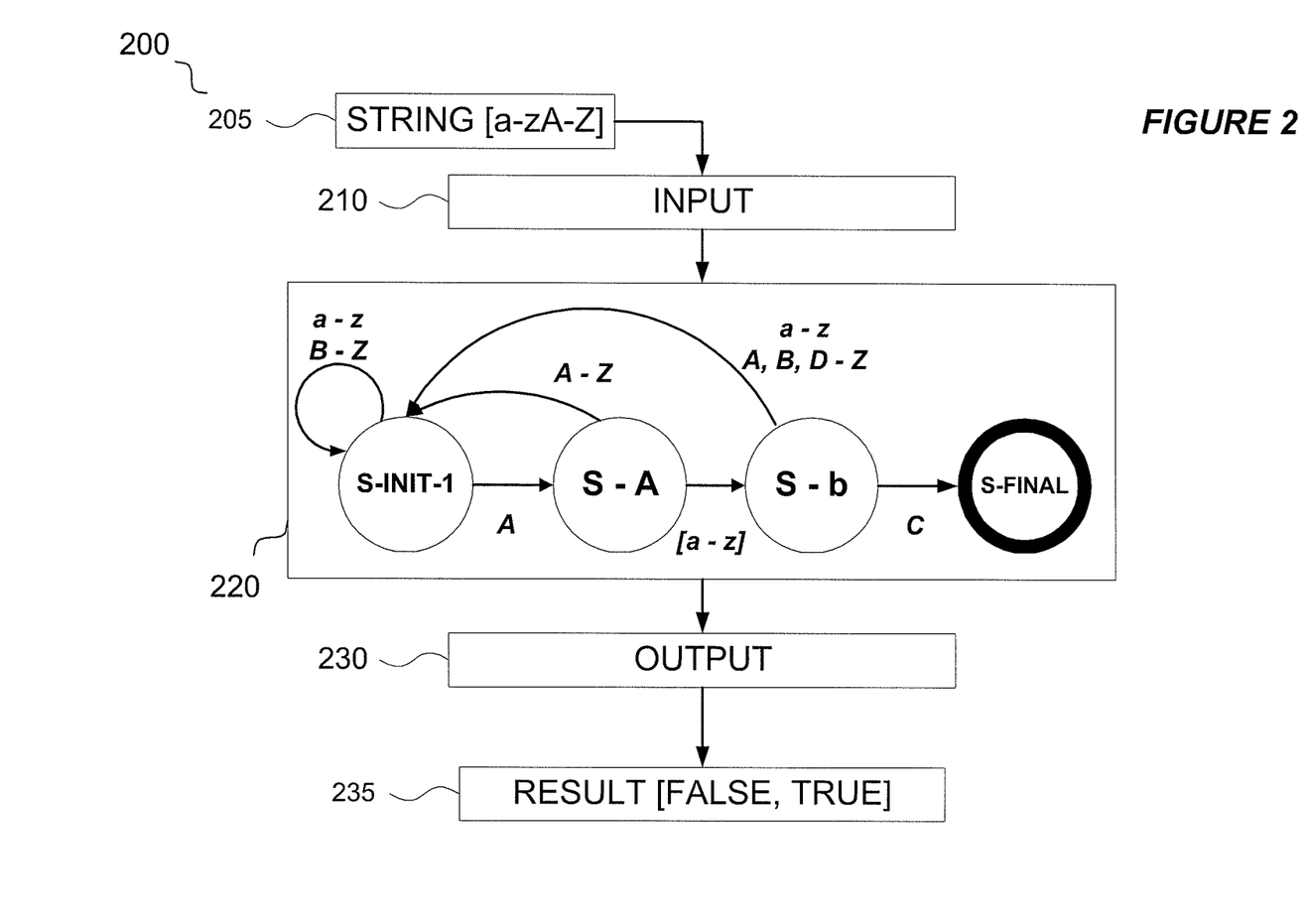
FIG. 2 is a block diagram depicting an exemplary state machine system.

FIG. 2 is a block diagram depicting an exemplary state machine system 200. The state machine 220 represents a regular expression (regex) "A[a-z]C". The regex represents a letter 'A', followed by any lower case letter 'a' to 'z', followed by a letter 'C'. The state machine system 200 compares an input string 205 (e.g., received over a network 114) with the regex. The input string 205 is fed into an input component 210 of the state machine system 200 one symbol at a time. The state machine 220 comprises four states: an initial state S-INIT-1, a second state S-A, a third state S-B, and a fourth state S-FINAL. The state machine 220 accepts any letter.

Initially, the state machine 220 is in state S-NIT-1. When the state machine 220 is at state S-INIT-1, a next input of 'A' moves the state to state S-A, but a next input of anything other than 'A' keeps the state in state S-INIT-1. At state S-A, a next input of a lower case letter moves the state to state S-b, but a next input of anything other than a lower case letter moves the state back to state S-INIT-1. At state S-b, a next input of 'C' moves the state to state S-FINAL, but a next state of anything other than 'C' moves the state back to state S-NIT-1. Arrowed, labeled lines between states depict transitions between states for an input character designated in the label. State changes back to state S-NIT-1 are defined as "fail" transitions.

An output component 230 checks whether the state machine 220 is in the final state S-FINAL. For example, after an input string 205 of "AbC" is fed into the state machine 220, the state machine will be in the state S-FINAL. Thus, the output component 230 outputs a "true" result 235 to designate that there is a match. However, after an input string 205 of "XYZ" is fed into the state machine 220 then the state machine will be in the state S-INIT-1. Thus, the output component 230 outputs a "false" result 235 to designate that there is not a match.

In another example, the alphabet could extend to single digit numbers. More complex regular expressions include closure operators to depict optional matching strings. For example, a closure operator of '*' depicts an optional number of occurrences of the preceding variable, with a minimum of zero occurrences. Therefore, input strings 205 of "AC", "AbC", "AbbC" all match the regex "A[a-z]*C". A positive closure operator of '+' depicts an optional number of occurrences of the preceding variable, with a minimum of one occurrence. Therefore, input strings 205 of "AbC", "AbbC" all match the regex "A[a-z]+C", but an input string 205 of "AC" does not match. However, character sets such as [a-z], especially with operators such as '*', increase the complexity of a corresponding state machine. A regex may also comprise keywords and anchor operators. A keyword is a word that has a meaning as a whole to a programming language, for example, "print".

More than one regular expression may be combined into a regular expression set, so that an input string can match any of the constituent regular expressions of the set. Regular expressions may include a range or a limited range of different character sets. For example, expressions that analyze text normally use sets such as: digits, lowercase letters, uppercase letters, punctuation and combinations of these sets.

Figure 3:
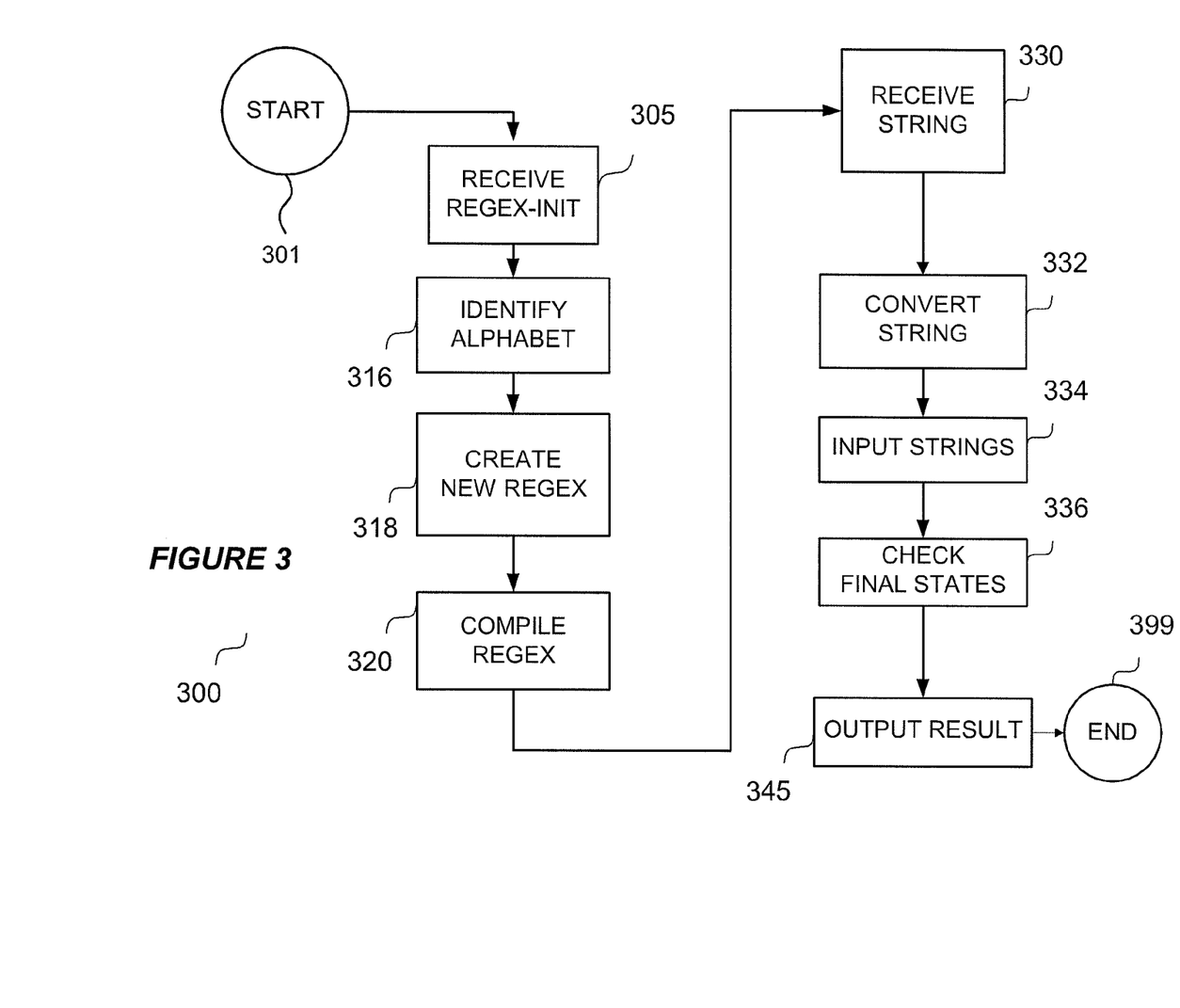
FIG. 3 is a high-level flow diagram for a method matching an input string with a regular expression, in accordance with an exemplary embodiment of the present invention.
Figure 4:
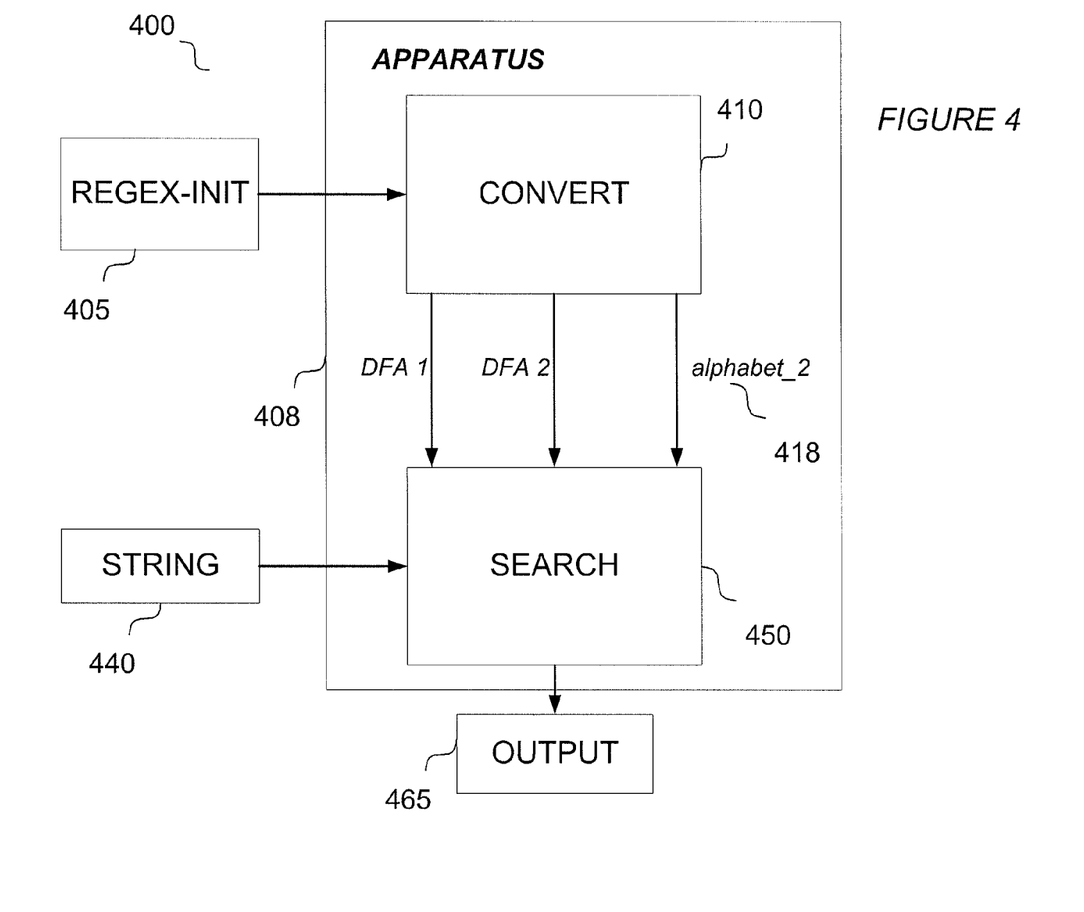
FIG. 4 is a block diagram depicting an apparatus, in which an exemplary embodiment of the present invention may be implemented.
Figure 5:
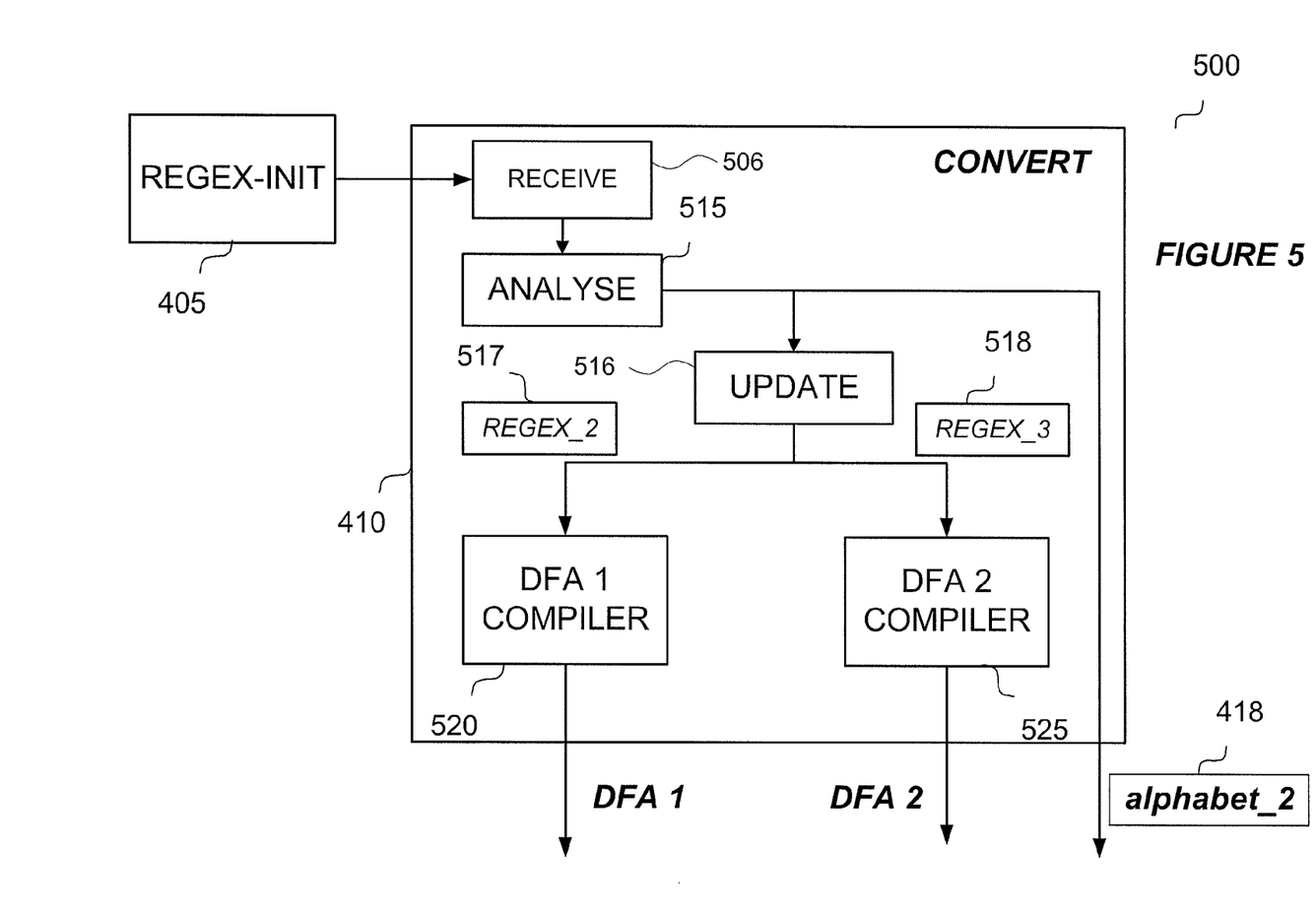
FIG. 5 is a block diagram depicting a convert component of the apparatus according to an exemplary embodiment of the present invention.
Figure 6:
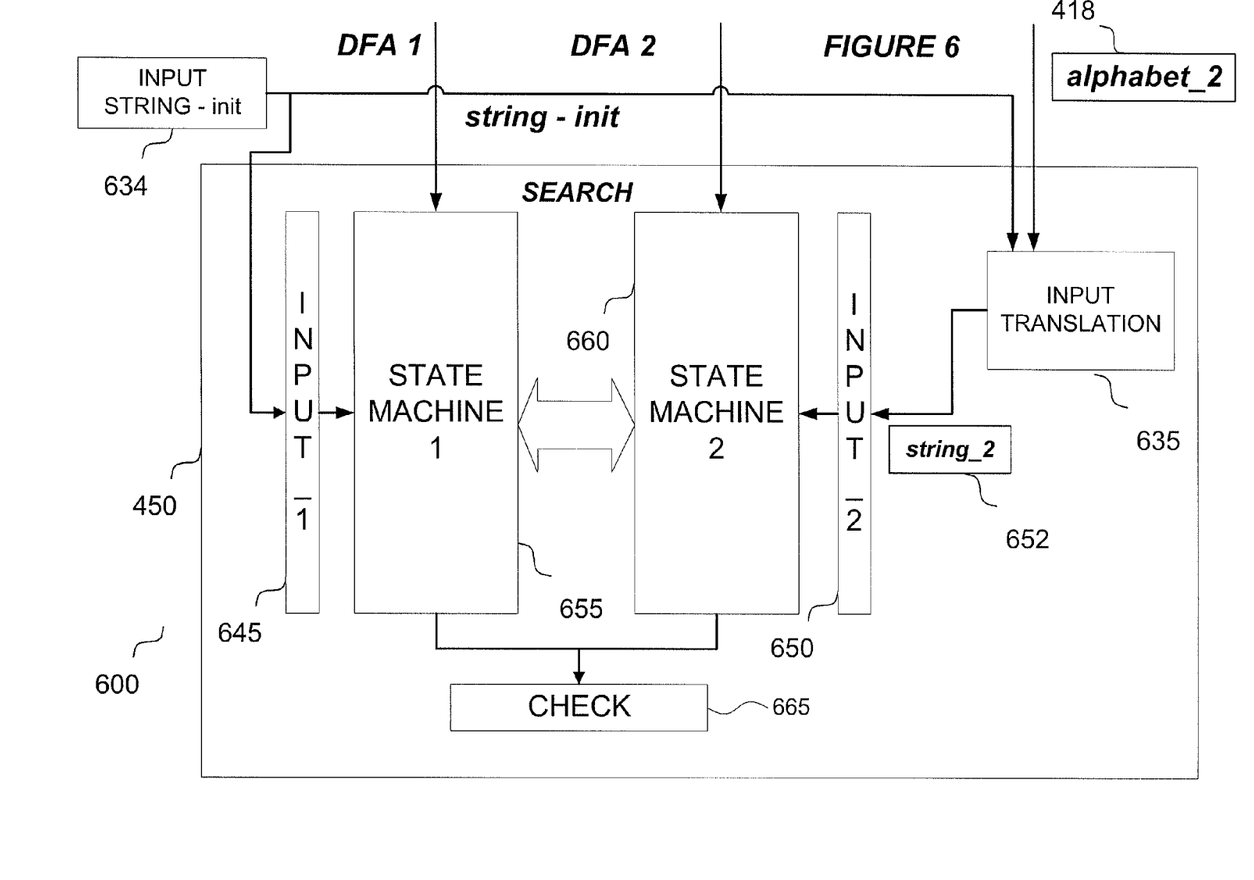
FIG. 6 is a block diagram depicting a search component of the apparatus according to an exemplary embodiment of the present invention.
Figure 7:
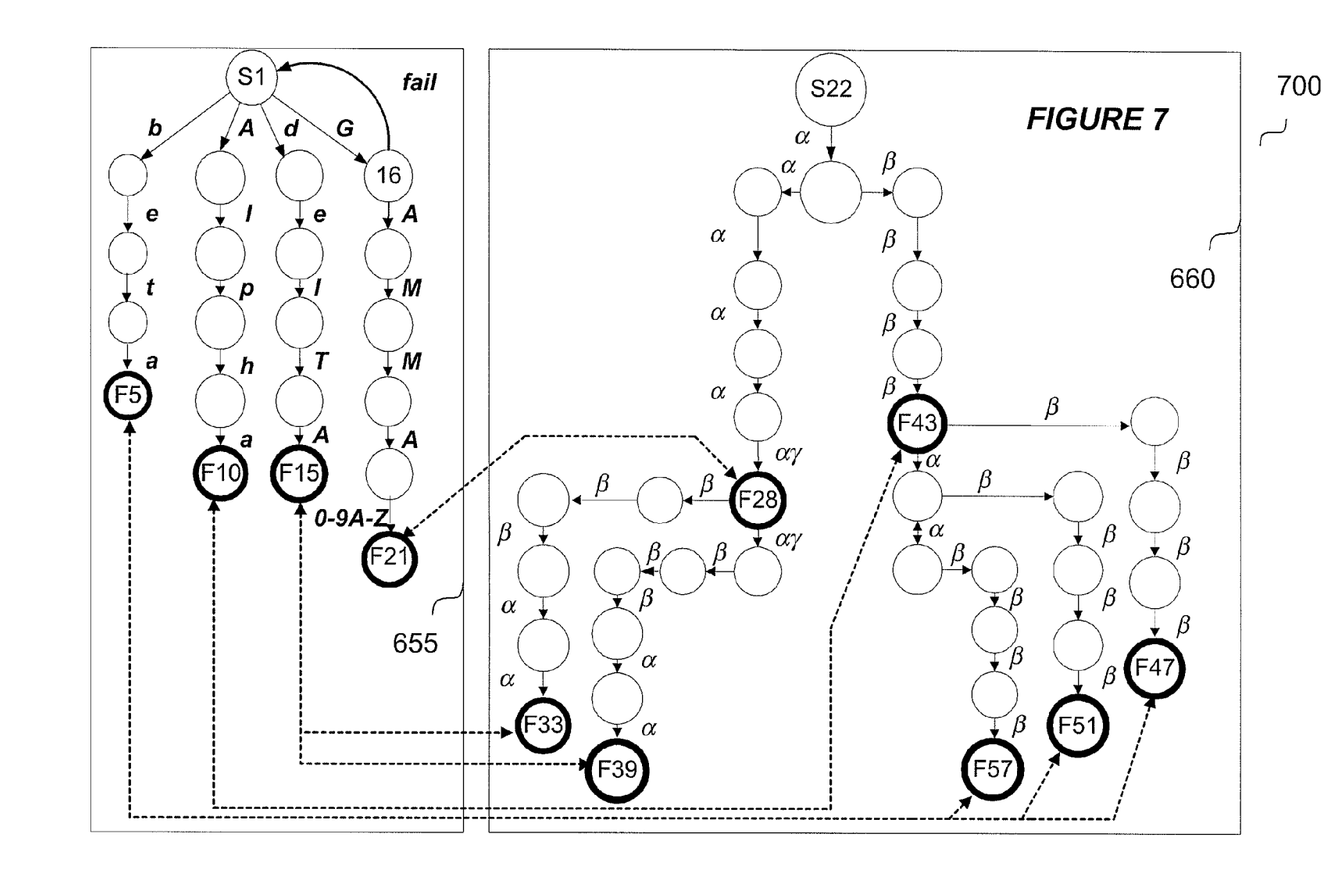
FIG. 7 is an exemplary state machine block diagram, in accordance with an exemplary embodiment of the present invention.

FIG. 3, will be described below in conjunction with FIG. 4, FIG. 5, FIG. 6, and FIG. 7. FIG. 3 is an exemplary high-level flow diagram 300 depicting operation method steps performed for matching an input string 440 with a regular expression set 405, in accordance with an exemplary embodiment of the present invention. The method steps may be performed by apparatus 408. The input string 440 may be received over network 114, loaded from local memory, etc. FIG. 4 is a block diagram 400 depicting the apparatus 408, according to an exemplary embodiment of the present invention. FIG. 5 is a block diagram 500 depicting a convert component 410 of the apparatus 408 according to an exemplary embodiment of the present invention. FIG. 6 is a block diagram 600 depicting a search component 450 of the apparatus 408 according to an exemplary embodiment of the present invention. FIG. 7 is a state machine block diagram 700 according to an exemplary embodiment of the present invention.

FIG. 3 is set forth as a logical flow chart diagram. As such, the depicted order and labeled steps are indicative of at least one exemplary embodiment of the presented method. However, other steps and methods may be conceived that are equivalent in function, logic, or effect of one or more steps or portions thereof, of the illustrated method. Additionally the format and symbols employed are provided to explain the logical steps of the method and are understood not to limit the scope of the method.

An example below is used to illustrate an exemplary embodiment of the present invention. In the example, an initial regular expression set 405 includes a first regular expression initial string_1 of "Alpha[A-Z]*beta", and a second regular expression initial string_2 of "GAMMA[0-9A-Z]⁺delta". The initial regular expression set 405 includes symbols from a first alphabet. For example, the first alphabet may include lower case letters 'a'-'z', upper case letters 'A'-'Z', and digits '0'-'9'. To further illustrate the example, two other input strings 440 are considered, which include a first initial string_1 of "GAMMA2delTA" and a second initial string_2 of "SALVE7delTA".

The method starts at step 301. At step 305, the receive component 506 of the convert component 410 receives the initial regular expression set 405. At step 316, an analyze component 515 analyzes the initial regular expression set 405 by examining the first alphabet of symbols used in the initial regular expression set 405 (for example, 'A', '9', 'e') to determine a minimal set of non-overlapping symbol sets that are represented in the initial regular expression set 405. The analysis is performed, for example, by analyzing all used symbol sets in the initial regular expression set 405, intersecting each symbol set with every other symbol set to determine non-overlapping symbol sets that will represent all possible input symbols. In this example, the non-overlapping symbol sets required are identified as [a-z], [A-Z], and [0-9].

The non-overlapping symbol sets are then mapped to three new symbols [e.g., á, â, and ä], such that [A-Z] is mapped to á, [a-z] is mapped to â, and [0-9] is mapped to ä. A symbol set alphabet 'alphabet_2' 418 is defined, which includes the new symbols that represent used symbol sets of the first alphabet.

At step 318, an update component 516 re-writes the initial regular expression set 405 as two equivalent regular expression sets: REGEX_2 517 and REGEX_3 518. The expression set REGEX_2 517 includes the initial regular expression set 405 using symbols of the first alphabet, so that components that create state machine complexities are removed (e.g., the closure operators '*' and '+', the optional operator '?', and the repetition operator "{n; m}". The optional operator '?' indicates a sub-expression is optional and the repetition operator "{n; m}" specifies that a sub-expression must be present at least "n" times and at most "m" times. Either numbers can be omitted, with "n" defaulting to and "m" defaulting to unbounded.

Therefore, expression set REGEX_2 becomes a first regular expression of "Alpha", a second regular expression of "beta", a third regular expression of "GAMMA[0-9A-Z]", and a fourth regular expression of "delTA". The expression set REGEX_2 517 includes only keywords, anchors and simple regular expressions, representing the details of the input strings 440 to be matched.

The expression set REGEX_3 518 includes the initial regular expression set 405, re-written using alphabet_2 418. The expression set REGEX_3 is defined over alphabet_2 418, comprising longer, but still simple expressions that represent the overall structure of the original expressions. The size of alphabet_2 418 is very small since practical regular expression sets typically use more or less the same combinations of character sets, such as upper or lower case letters, digits, punctuation, etc. Therefore, the expression set REGEX_3 518 becomes a first regular expression of "áâââââá*âââá" and a second regular expression of "ááááá[ä á]⁺âââáá".

At step 320, a first DFA compiler 520 (referred to as DFA_1) compiles expression set REGEX_2 517 to generate a first state machine 655 (referred to as DFA1). The first state machine DFA1 may operate on only simple regular expressions and keywords. A second DFA compiler 5252 (referred to as DFA_2) compiles expression set REGEX_3 518 to generate a second state machine 660 (referred to as DFA2). The second state machine DFA2 may operate on only alphabet_2 418. For the input string 440 to match the regular expression set 405, the input string 440 should match the keywords, anchors and simple regular expressions as well as the overall structure of the regular expression set 405. Therefore, states in first state machine DFA1 655 are correlated to states in the second state machine DFA2 660, in such a way as to recognize individual expression details only if they appear inside the context of the initial regular expression 405.

FIG. 7 depicts exemplary correlated first and second state machines DFA1 655 and DFA2 660. State S1 depicts the initial state of DFA1 655. State S22 depicts the initial state of DFA2 660. States F5, F10, F15, and F21, in DFA1 655, depict first conditional final states. States F28, F33, F39, F43, F47, F51, and F57, in DFA2 660, depict second conditional final states. First conditional final states in DFA1 655 are correlated with one or more second conditional final states in DFA2 660. For example, first conditional final state F5 is correlated with second conditional final states F47, F51, and F57. For clarity, only the initial states and the conditional final states are numbered. Also for clarity, only one fail transition is depicted, between state 16 and state S1.

Conditional final states are termed "conditional", because the finality of the state is conditioned on its corresponding finality in the related state machine. Only conditional final states are correlated across the two state machines DFA1 655, DFA2 660. In contrast to conditional final states, there is no relation between unconditional final states of the two state machines. FIG. 7 does not illustrate any unconditional final states.

At step 330, an input component 634 of a search component 450 receives an initial string 440 (e.g., from the network 114). At step 332, a translation component 635 translates the initial string 440 using alphabet_2 418 into a second string 'string_2' 652. For example, the first initial input string of "GAMMA2delTA" 440 translates into "ááááááäââââá", and the second initial input string of "SALVE7delTA" 440 also translates into "áááááäââââá".

At step 334, initial string 440 is entered into state machine DFA1 655 through input 1 component 645, in parallel with string_2 652 entered into state machine DFA2 660 through input_2 component 650. The initial string 440 and string_2 652 are entered one symbol at a time until all symbols have been entered. Any matching conditional final states that are reached are recorded as validated results by the check component 665.

At step 336, validated results and any other final states reached (for example, in at least alternative embodiment, a state machine could include unconditional final states) are checked and collated by the check component 665. A result is output by the output component 465.

Using the example of initial string_1 440, the symbols of "GAMMA2delTA" 440 and of "áááááäáâáââ" 652 are entered into DFA1 655 and DFA2 660 respectively in parallel, one symbol at a time. After the symbols of "GAMMA2" and "ááááää" have been entered, conditional final states F21 and F28 respectively are reached resulting in a validated result, which is recorded by the final check component 665. Subsequently, after the symbols of "delTA" and "âââáá" have been entered, conditional final states F15 and F33 are reached. As both F21 and F28 correlate, and F15 and F33 correlate, a "true" result is output by the output component 465.

In contrast, using the example of initial string_2 440, the symbols of "SALVE7delTA" 440 and of "áááááäâââáâá." 652 are entered into DFA1 655 and DFA2 660 respectively in parallel, one symbol at a time. After the symbols of "SALVE7" and "áááááä" have been entered, state S1 and F28 respectively are reached. For example, the 'S' of "SALVE7" does not correspond to any of the first states after state S1. S1 and F28 are not correlated states and therefore no validated result is recorded by the final check component 665. Subsequently, after the symbols of "delTA" and "âââáá" have been entered, conditional final states F15 and F33 are reached. Although F15 and F33 correlate with each other, no other validated result was recorded and therefore a "false" result is output by the output component 465. At step 345, a final result is output to an output component 465. The method ends at step 399.

In at least one exemplary embodiment, the state machines 660 and 665 are deterministic finite state automata (DFAs). In at least one alternative exemplary embodiment, the state machines 660 and 665 are non-deterministic finite state automata (NFAs), or a combination of a DFA and a NFA.

In at least one exemplary embodiment, any DFA implementation can be used as underlying support for the above-described decomposition strategy. For example, a keyword graph deterministic automaton, a hardware BFSM implementation, or even a classical DFA may be used.

In at least one exemplary embodiment of the invention, the initial regular expression set 405 is decomposed into more than two state machines 660, 665, comprising the first alphabet, and more than one further alphabet_2 418. The initial string 440 is translated using the alphabet_2s 418 to provide string_2s 652 before processing by the more than two state machines 660 and 665.

In an alternative exemplary embodiment, an initial regular expression set 405 includes a keyword, which is a word interpreted as a whole. The keyword is not made up of character symbols and appears in the first state machine DFA1 655, because such a keyword cannot be translated into the second state machine using the symbol mapping. However, a keyword that is constructed from character symbols only, such as "[0-9][0-9][0-9]", appears in the second state machine DFA2 600, because such a keyword can be represented in a very compact form once the keyword is translated using the mapped symbol set. In contrast, inclusion of a keyword that is only constructed from character symbols in the first state machine DFA1 655 results in state explosion in the first state machine DFA1 655. Compact state machines require less memory resources than state machines that have more states. Keywords result in unconditional final states in the state machines DFA1 655 and DFA2 660.

In at least one exemplary embodiment, a symbol set is mapped onto more than one mapped symbol sets. For example, if [A-Z] is mapped to á, and [a-z] is mapped to â, then [A-Za-z] is mapped onto áâ.

The above described removal of state machine complexity may include re-writing expressions of a regular expression set to an equivalent expression set that excludes one or more closure operators "*", '+', optional operators '?', or repetition operators "{n; m}". The positive closure operator '+' can be re-written using the closure operator. For example, the regular expression <AB+C> can be rewritten as <ABB*C>. The optional operator '?' can be rewritten by combinatorial expansion of the '?' operators and then pruning all redundant expressions. Further, the repetition operator "{n; m}" can be rewritten by expanding the regular expression by replacing all un-bounded repetitions and inserting a closure operator at '*' the end. For example, a regular expression of <AB{3;5}C> can be converted into <ABBBC ABBBBC ABBBBBC>, and a regular expression of <AB {3;} C> can be converted into <ABBBB*C>.

The methods and arrangements described above may be performed fully or partially in hardware, a field-programmable gate array (FPGA), or an application-specific integrated circuit (ASIC). However, the method and arrangements described above may also be performed fully or partially in software running on one or more processors (not depicted in the Figures), and the software may be provided in the form of one or more computer program elements carried on any suitable data-carrier (also not depicted in the Figures) such as a magnetic or optical storage device or the like.

In at least one exemplary embodiment, the above-described messages 140 may be email messages. However, the present invention is not limited thereto, and is applicable to other types of messages (e.g., those that have a distribution list that can be updated).

Figure 8:
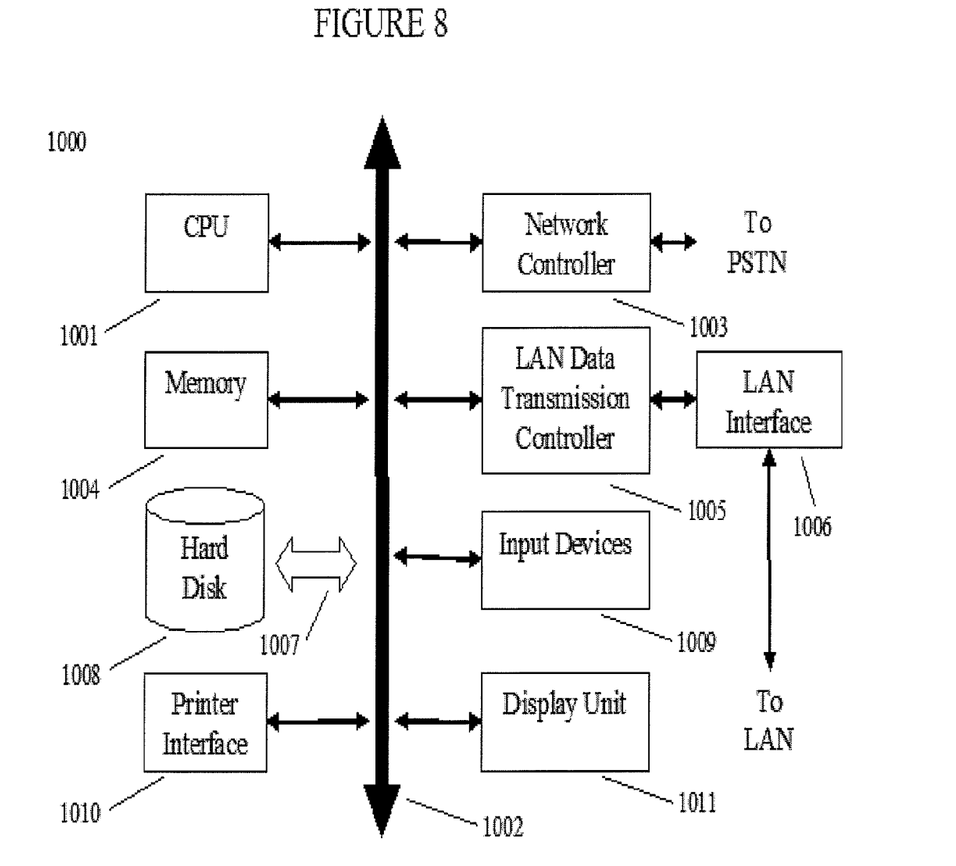
FIG. 8 is shows an example of a computer system capable of implementing the methods and systems according to embodiments of the present invention.

FIG. 8 illustrates an example of a computer system which may implement methods and/or systems of the present disclosure. The system and methods of the present disclosure, or part of the system and methods, may be implemented in the form of a software application running on a computer system, for example, a mainframe, personal computer (PC), handheld computer, server, etc. For example, the convert component 410 and the search component 450 of FIG. 4, the analyze component 515, the update component 516, the first DFA1 compiler 520 and the DFA2 compiler 525 of FIG. 5, the input translation component 635, the first state machine 655, the second state machine 650, and the check component 665 o FIG. 6 may be implemented as software application(s) that perform the methods described above with reference to corresponding aspects of FIGS. 4-6. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008, via a link 1007. CPU 1001 may be the computer processor that performs the steps of the methods described above with reference to FIGS. 3-7.

The input string may be received through the LAN interface 1006 and the results of the matching determined by embodiments of the present invention may be output from the computer systems, for example through LAN interface 1006, through printer interface 1010, or on display unit 1011.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

What is claimed is:

1. An apparatus comprising a data processing system for matching a first input string with a first regular expression set, the data processing system comprising:
    a processor;
    memory storing a computer program;
    a processor configured to execute the computer program, wherein the computer program includes instructions for performing:
        mapping all non-overlapping symbol sets of the first regular expression set to respective unique symbols not present in the first regular expression set;
        re-writing the first regular expression set as a second regular expression set by removing a symbol set of the first regular expression set repeating at least one;
        re-writing the first regular expression set as a third regular expression set by replacing all the non-overlapping symbol sets of the first regular expression set with their corresponding mapped unique symbols; and
        operating a first state machine built from the second regular expression set and a second state machine built from the third regular expression set to determine whether the first input string matches with the first regular expression set,
    wherein each non-overlapping symbol set includes one or more symbols and none of the non-overlapping symbol sets share the same symbol.

2. The apparatus of claim 1, wherein the first state machine comprises at least one first conditional final state, wherein the second state machine comprises at least one second conditional final state, and wherein each first conditional final state corresponds to at least one second final state.

3. The apparatus of claim 2, wherein a match is determined when the first state machine is in a conditional final state and the second state machine is in a corresponding conditional final state.

4. The apparatus of claim 3, wherein at least one of the first state machine and the second state machine further comprises at least one unconditional final state.

5. The apparatus of claim 1, further comprising a network, wherein the data processing system receives the first input string across the network.

6. The apparatus of claim 1, wherein at least one of the first state machine and the second state machine is deterministic.

7. A method for matching a first input string with a first regular expression set in a data processing system, the method comprising:
    determining, by the data processing system, a minimal set of non-overlapping symbol sets that are represented in the first regular expression set;
    mapping, by the data processing system, the non-overlapping symbol sets to new unique symbols, respectively;
    generating, by the data processing system, a second regular expression set by re-writing the first regular expression set to remove one of the symbol sets that repeats at least one;
    generating, by the data processing system, a third regular expression set by replacing the non-overlapping symbol sets in the first regular expression set with their corresponding new mapped unique symbols; and
    determining, by the data processing system, whether the first input string matches the first regular expression using a first state machine built from the second regular expression set and a second state machine built from the third regular expression set,
    wherein each non-overlapping symbol set includes one or more symbols and none of the non-overlapping symbol sets share the same symbol.

8. The method of claim 7, wherein the removed symbol set prior to its removal is followed by a closure operator, a repetition operator, or an optional operator in the first regular expression set.

9. The method of claim 7, wherein at least one of the non-overlapping symbol sets comprises only at least two alphabetic letters.

10. The method of claim 7, wherein at least one of the non-overlapping symbol sets comprises only at least two numerals.

11. The method of claim 7, wherein the determining whether the first input string matches the first regular expression comprises:
    determining which symbol of the first input string is present within one of the non-overlapping symbols sets;
    generating a second input string by replacing the determined symbol in the first input string with the corresponding new unique symbol that the one non-overlapping symbol set is mapped to;
    operating the first state machine on the first input string;
    operating the second state machine on the second input string; and
    determining a match based on outputs of the first state machine and the second state machine.

12. The method of claim 11, wherein determining the match comprises indicating a match when a state output by the first state machine is a final state and a state output by the second state machine is a corresponding final state.

13. The method of claim 11, wherein determining the match comprises indicating a non-match when a state output by one of the first or second state machines is an initial state.

14. The method of claim 12, wherein the final states are either conditional or unconditional.

15. The method of claim 7, wherein the first input string is received by the data processing system across a network.

16. The method of claim 7, wherein at least one of the first state machine and the second state machine is deterministic.

17. The method of claim 7, wherein the first input string and the second input string are input into the first state machine and second state machine in parallel, respectively.

18. A computer program product for matching a first input string with a first regular expression set, the computer program product comprising:
    a computer readable storage medium having computer readable program code embodied therewith, the computer readable program, code comprising:

computer readable program code configured to:
- determine a minimal set of non-overlapping symbol sets that are represented in the first regular expression set,
- map the non-overlapping symbol sets to new unique symbols, respectively,
- generate a second regular expression set by re-writing the first regular expression set to remove one of the symbol sets that repeats at least once,
- generate a third regular expression set by replacing the non-overlapping symbol sets in the first regular expression set with their corresponding new mapped unique symbols; and
- determine whether the first input string matches the first regular expression using a first state machine built from the second regular expression set and a second state machine build from the third regular expression set, wherein each non-overlapping symbol set includes one or more symbols and none of the non-overlapping symbol sets share the same symbol.

19. The computer program product of claim 18, wherein the at least one of the first state machine and the second state machine is deterministic.

20. The apparatus of claim 1, wherein the using comprises:
- determining which symbol of the first input string is present within one of the non-overlapping symbols sets;
- generating a second input string by replacing the determined symbol in the first input string with the corresponding unique symbol that the one non-overlapping symbol set is mapped to;
- inputting the first input string into the first state machine; and
- inputting the second input string into the second state machine.

21. The apparatus of claim 20, wherein the first input string and the second input string are input into the first state machine and second state machine in parallel, respectively.

22. The method of claim 1, wherein the removed symbol set prior to its removal is followed by a closure operator, an optional operator, or a repetition operator in the first regular expression set.

23. The computer program product of claim 18, wherein the removed symbol set prior to its removal followed by a closure operator, a repetition operator, or a optional operator in the first regular expression set.

* * * * *